(12) United States Patent
Nalawadi et al.

(10) Patent No.: US 7,093,118 B2
(45) Date of Patent: Aug. 15, 2006

(54) SYSTEM AND METHOD FOR EXTERNAL BUS DEVICE SUPPORT

(75) Inventors: Rajeev K. Nalawadi, Folsom, CA (US); Frederick H. Bolay, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 09/894,294

(22) Filed: Jun. 27, 2001

(65) Prior Publication Data

US 2003/0005272 A1    Jan. 2, 2003

(51) Int. Cl.
*G06F 15/177* (2006.01)

(52) U.S. Cl. .............. 713/2; 710/10; 710/261

(58) Field of Classification Search ........... 710/10, 710/261; 713/2
See application file for complete search history.

(56) References Cited

U.S. PATENT DOCUMENTS

| | | | |
|---|---|---|---|
| 5,802,318 A * | 9/1998 | Murray et al. ............. 710/100 |
| 6,067,589 A * | 5/2000 | Mamata ...................... 710/63 |
| 6,128,732 A * | 10/2000 | Chaiken ........................ 713/2 |
| 6,272,499 B1 * | 8/2001 | Wooten ...................... 707/102 |
| 6,401,202 B1 * | 6/2002 | Abgrall ........................ 713/2 |
| 6,467,008 B1 * | 10/2002 | Gentry et al. .............. 710/261 |
| 6,480,914 B1 * | 11/2002 | Hsieh ........................... 710/73 |
| 6,615,288 B1 * | 9/2003 | Herzi .......................... 710/10 |
| 6,718,401 B1 * | 4/2004 | Nalawadi et al. ............ 710/13 |
| 6,772,252 B1 * | 8/2004 | Eichler et al. .............. 710/104 |

OTHER PUBLICATIONS

Intel, "Instantly Available Power Managed Desktop PC Design Guide", Revision 1.2, Sep. 25, 1998.*
Intel Corporation, "Universal Host Controller Interface (UHCI) Design Guide", Revision 1.1, Mar. 1996.*
"Universal Serial Bus PC Legacy Compatibility Specification", Draft Revision 0.9, May 30, 1996.*

* cited by examiner

*Primary Examiner*—Thomas Lee
*Assistant Examiner*—Albert Wang
(74) *Attorney, Agent, or Firm*—Blakely, Sokoloff, Taylor & Zafman LLP (57) ABSTRACT

System and method for external bus device support. The system comprises a processor, a memory, one or more external bus controllers and a basic input-output system (BIOS). The BIOS contains an external bus support component to cause a periodic interrupt to be generated and to provide support for external bus enabled devices responsive to the periodic interrupt. The method comprises obtaining a portion of the memory to be used to maintain a plurality of external bus device data; causing an interrupt to be periodically generated; and handling input produced by external bus enabled devices using the portion of the memory. The interrupt may be a system management interrupt (SMI) of the 32-bit Intel Architecture (IA-32). The external bus controller may be a Universal Serial Bus (USB) host controller, the external bus devices may be USB devices, and the external bus support component may be a USB support component.

29 Claims, 5 Drawing Sheets

SYSTEM AND METHOD FOR EXTERNAL BUS DEVICE SUPPORT

FIELD OF THE INVENTION

This invention relates to computers and computing devices that include external bus enabled devices, such as Universal Serial Bus (USB) devices, and more particularly to providing support for USB and other external bus enabled devices during system boot up, before operating system support for USB and other external bus enabled devices is present, by issuing a periodic software interrupt.

BACKGROUND

As personal computers have evolved, the processing power, available memory, available peripheral devices and personal computer features such as the kinds of peripheral connection methods have increased with each passing year. When powering on a personal computer, a basic input-output system (BIOS) controls what occurs. A BIOS may check the status of various hardware components and devices and receive input from the hardware devices, such as keyboard, mouse, and other input devices. To receive such input, the BIOS must be able to receive data from and otherwise communicate with the devices attached to or included in the system. For example, it may be necessary for the BIOS to receive user input from a keyboard or for the BIOS to initiate execution of startup software to be read from, for example, a floppy disk, hard disk, and compact disk read-only memory (CD-ROM). To provide support for all of these devices, the BIOS contains software that is executed in system memory that serves as device drivers or other software that supports various devices until an operating system including drivers for the particular devices is loaded.

BRIEF DESCRIPTION OF THE DRAWINGS

The invention described herein is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

In many current computers, support must be provided for external devices while the system is booting up and while the operating system is loading, until the operating system and device drivers have completed loading. To allow the system to support one or more external peripheral devices during system boot up, the basic input-output system (BIOS) includes support software to process input from external devices during system boot up.

In many current computer systems, and particularly processors available from Intel Corporation having a 32-bit architecture known as IA-32 and other processors compatible with the 32-bit Intel Architecture, (See *IA-32 Intel Architecture Software Developer's Manual* available from Intel Corporation, Santa Clara, Calif.), before operating system support for external devices, such as, Universal Serial Bus (USB) devices is present, the BIOS enables the chipset (hardware) to convert all enabled USB hardware interrupt occurrences into USB legacy system management interrupts (SMIs). The SMI that is generated internally by the chipset (hardware) after conversion of the USB interrupt to an SMI is referred to herein as a "USB legacy SMI". There is a single SMI pin connection from the chipset (hardware) to the processor, and there are various individual sources of SMIs in the system. The chipset (hardware) acts as a collector for all SMI events in the system. When any of the SMI sources is active in the system, the chipset (hardware) asserts the SMI pin to the processor. This SMI pin assertion from the chipset (hardware) to the processor is referred to herein as a "Hardware SMI". When the SMI signal is asserted, the processor enters System Management Mode (SMM) and the BIOS code executes. The BIOS includes SMM software that checks for various registers in the chipset (hardware) to determine the source of the SMI and handle it appropriately. Among the various SMI sources in the system, there is a capability provided in the chipset (hardware) to generate an SMI periodically based on expiration of an internal hardware timer. The granularity and the occurrence of this periodic SMI is programmable by the BIOS. This SMI is referred to herein as a "periodic software SMI". A periodic software SMI issues, is generated, whenever an internal timer in the chipset times-out. The periodic software SMI can occur in conjunction with SMIs, generated by other sources, such as by software writing to known specific registers in the chipset (hardware). Hence, the periodic software SMI may be referred to as an "asynchronous periodic software SMI". The granularity of the periodic software SMI occurrence may vary among various chipsets that may be used in a system, but a few feasible granularities are provided in all the chipsets. The BIOS SMM software is usually capable of handling multiple SMI occurrences during one instance of the SMM code execution. In addition, the chipset also provides various software controls to enable and disable the various USB interrupt sources, and also to enable and disable the occurrence of USB legacy SMIs. However, many existing computer systems do not have chipset (hardware) that allows for the conversion of USB hardware interrupts into legacy USB software interrupts.

In the system and method described herein, when the chipset (hardware) does not have the capability to generate a USB legacy SMI, software added to a traditional BIOS sets an asynchronous periodic software SMI, and parses through and processes completed USB descriptors of one or more USB host controller(s) when the periodic software SMI is generated. The chipset (hardware) provides different time periods for the occurrence of the asynchronous periodic software SMI generation. On every asynchronous periodic software SMI occurrence, the USB support software parses through completed USB descriptors. In one embodiment, the USB support software dynamically increases or decreases the periodic SMI occurrence to a faster or slower rate to handle the data transfer rate of attached USB devices. To parse through the USB descriptors without interference from existing components, the USB support software disables the conversion of USB hardware interrupts into USB legacy software interrupts and also disables the chipset (hardware) from generating USB interrupts.

Figure 1:
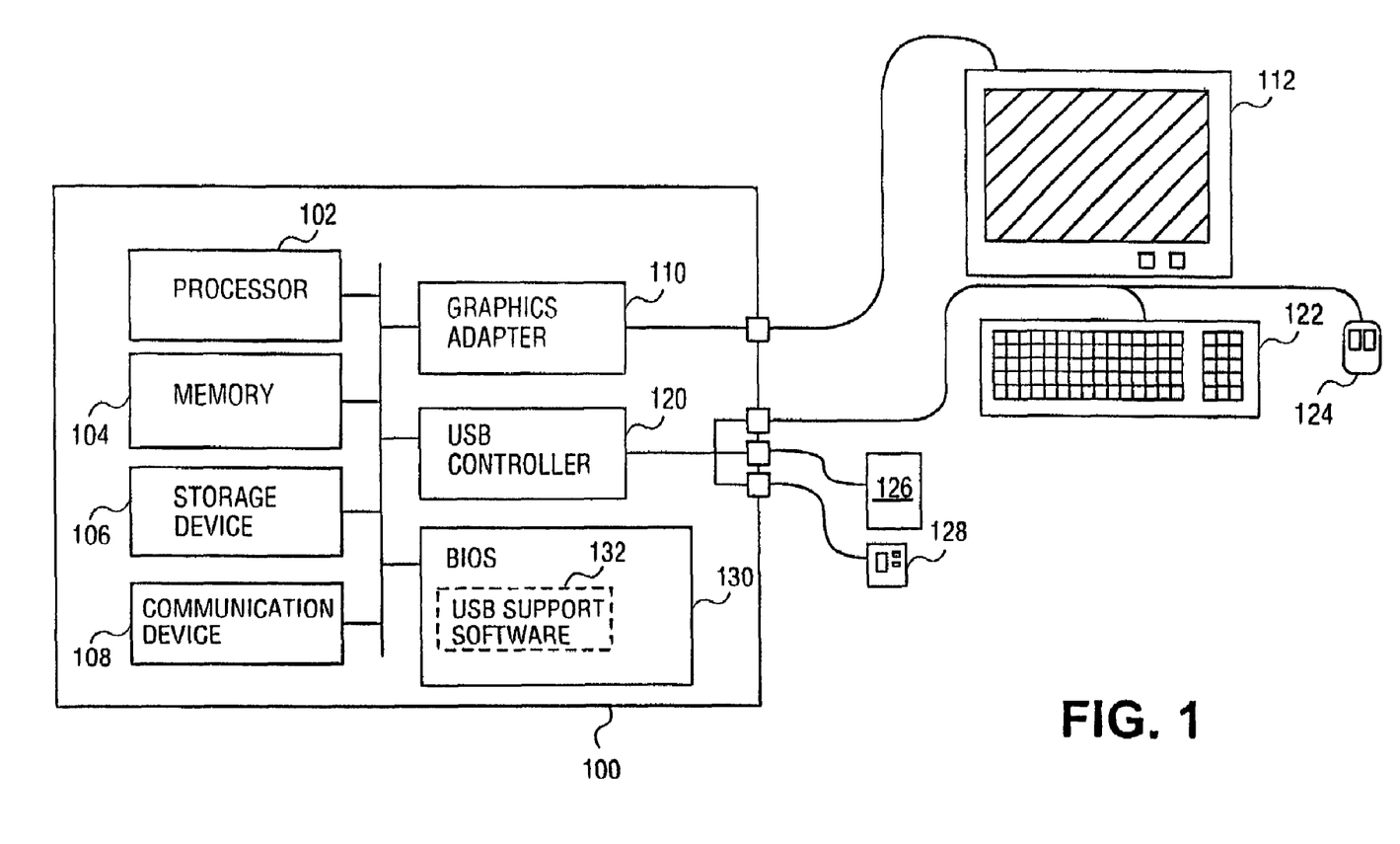
FIG. 1 illustrates a hardware environment in which one embodiment of the invention executes.

FIG. 1 illustrates a hardware environment in which one embodiment of the invention executes. A computing device such as personal computer 100 may include processor 102, memory 104, storage device 106, and communications device 108 coupled to bus 140. In one embodiment, the processor may be a processor conforming to or compatible with the 32-bit Intel Architecture known as IA-32. In one embodiment, memory 104 may be any kind of random access memory (RAM). In one embodiment, storage device 106 may be any kind of machine readable medium including, for example, magnetic media such as disk drives and magnetic tape; optical drives such as compact disk read only memory (CD-ROM) and readable and writeable compact disks (CD-RW); stick and card memory devices; ROM, RAM, flash memory devices and the like; whether internal, such as storage device 106, directly coupled such as such as external device 126, accessible locally or remotely via a network, and via electrical, optical, acoustical or other form of propagated signals (e.g., carrier waves, infrared signals, digital signals, etc.) via communications device 108. In one embodiment, communications device 108 may be a modem, network interface unit, or other communications device that allows for communication with other computing devices.

Personal computer 100 may include graphics adapter 110 that allows for the display of information such as text and graphics on display monitor 112. Graphics adapter 110 may provide support for the video graphics array (VGA), super VGA (SVGA) and/or other graphics standards. In one embodiment, graphics adapter 110 may be included as part of an integrated processor/graphics chipset. In one embodiment, graphics adapter 110 may be coupled to the system via an Accelerated Graphics Port (AGP) interface supported by the chipset used in personal computer 100.

Personal computer 100 may include an external bus controller, such as, USB host controller 120 which allows for two-way communication with external USB devices, such as external device 126. Although only one USB host controller is shown, multiple USB host controllers and/or other external bus controllers may be physically included in the personal computer. In various embodiments external device 126 may be any USB enabled device, such as, for example, a machine readable medium reader and/or writer, a digital camera, a printer, a digital music player/recorder such as an MP3 player, etc. Various USB enabled input devices may also be coupled to personal computer 100 via USB controller 120, such as, for example, keyboard 122 and mouse 124. In one embodiment, a USB enabled biometric device such as fingerprint reader 128, retinal scanner or voice recognition device may be coupled to personal computer 100 via USB controller 120. Although these devices are referred to and/or are depicted as external devices or external bus enabled devices, the devices may exist inside or otherwise within the enclosure of a computer or other computing device. These devices are called external devices because they communicate via what are well known as external bus protocols via external bus controllers, such as USB. In addition, each of the devices may include its own controller, such as a USB host controller. In one embodiment, the USB devices and host controller(s) may conform to the *Universal Serial Bus Specification,* Revision 1.1, dated Sep. 23, 1998 and/or Revision 2.0 dated Apr. 29, 2000 (the "USB Specification").

Graphics adapter 110 and USB controller 120 are each coupled to bus 140. Although only one each of processor 102, external device 126 and storage device 106 are depicted, multiple processors and multiple storage devices may be included in personal computer 100, and multiple external USB devices may be coupled to personal computer 100 via USB controller 120. A basic input-output system (BIOS) 130 that may include a USB support component such as USB support software 132 is also coupled to bus 140. BIOS 130 may be software stored in hardware, such as, for example, an electrically erasable programmable read-only memory (EEPROM) device, a flash memory device, etc. In one embodiment, the BIOS and/or the USB support software may be updated or installed from computer instructions stored on a machine readable medium such as a floppy disk or CD-ROM. In this embodiment, the instructions are copied or otherwise transferred from the machine readable medium to the BIOS chip such that they are executed during all subsequent booting up of the system. In one embodiment, bus 140 may be a USB such that all components and devices communicate via USB. USB support software 132 is discussed in more detail below.

According to one embodiment of the system and method presented herein, during start-up of the computing device, the computing device may request input from the user or the user may access an input device, such as a keyboard, to alter the regular boot process. To request and receive user input during boot up, software in the BIOS may display information on a display to the user, and the user may provide input via a keyboard or keypad, a mouse, a biometric device, and/or another input device, each of which may be coupled to the computing device via USB. In addition, in one embodiment, a user identification card may be presented via a USB enabled card reader (not shown) to authenticate the user's access to the computing device. In some situations, a software update or other software may need to be read or otherwise executed by the BIOS from a storage device coupled to the computing device via the USB controller. To support the multitude of devices which may be coupled to the computing device via one or more USB host controllers, the BIOS stores device information and/or device driver information in the computing device's memory, including USB device data such as transfer descriptors.

Figure 2:
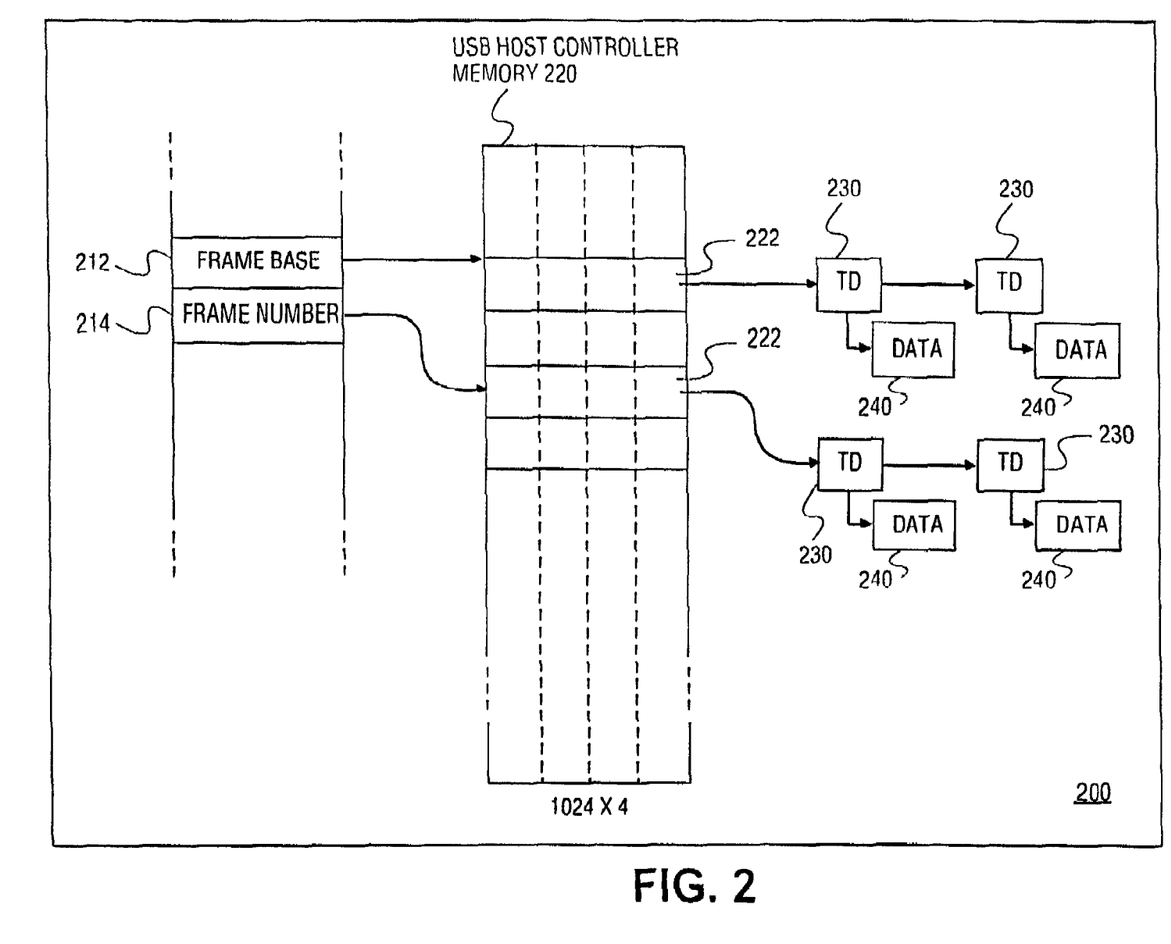
FIG. 2A illustrates a diagram of Universal Serial Bus (USB) controller registers and system memory showing the organization of USB data.
FIG. 2B illustrates a diagram of system memory showing the location of Universal USB support memory.
Figure 2A:
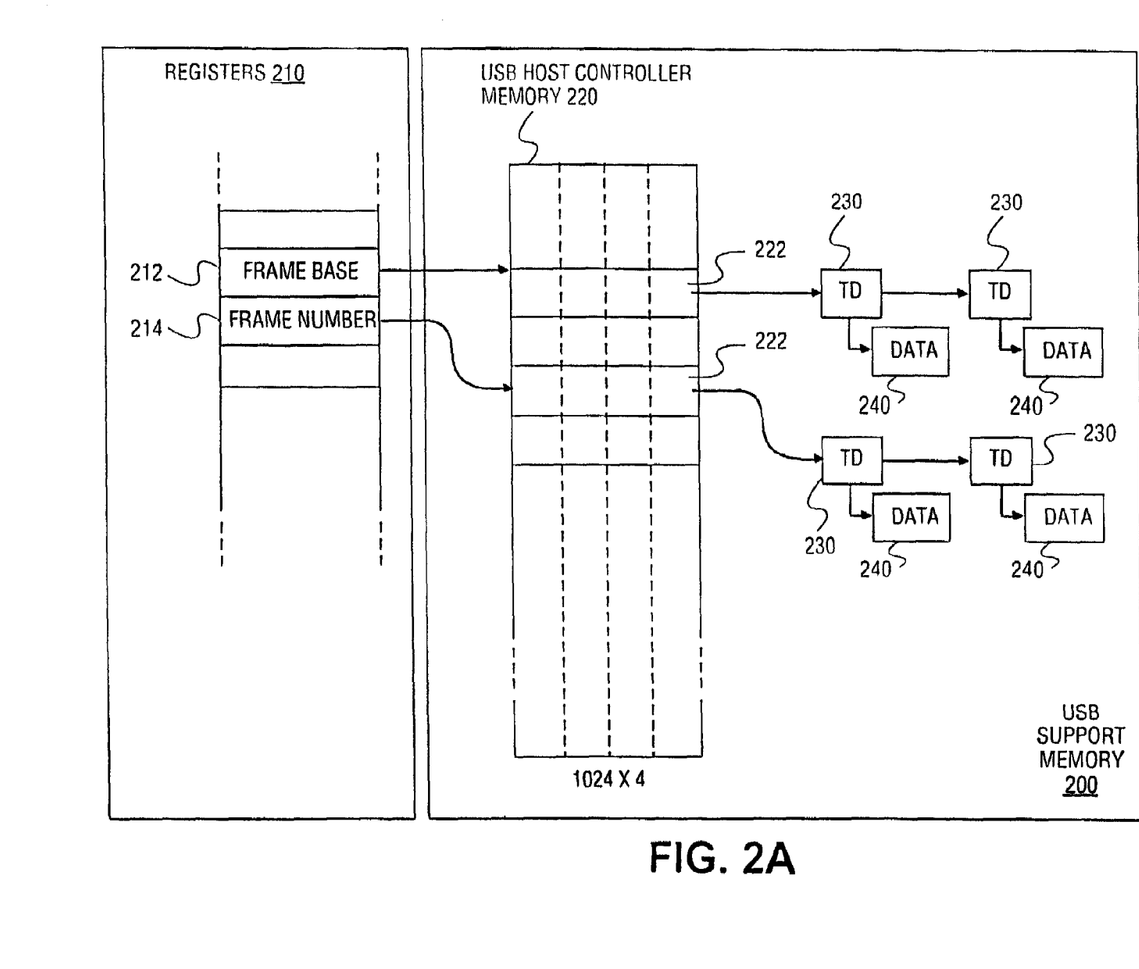

FIG. 2A illustrates a diagram of USB controller registers and system memory showing the organization of USB data. USB host controllers have 1024 frames associated with them in memory such that each USB host controller is represented in memory by a 1024×4 byte region. (See the USB Specification.). In one embodiment, a portion of system memory is obtained to be used to be used by USB support software to maintain USB data. USB support memory 200 may include a portion of memory designated USB host controller memory 220 to hold USB host controller data.

USB host controllers include well-known registers that are used to access and control the USB host controller and the controllers communication with USB devices. In one embodiment, a USB host controller may include registers 210. Registers 210 include a register or registers that points to frames in USB host controller data 220, such as frame base 212 and frame number 214. Frame base 212 and frame number 214 point to a base address of a list of frames and a frame number, or offset, in USB host controller memory 220. Each frame 222 in USB host controller memory 220 points to a transfer descriptor 230 having USB data 240 associated with the transfer descriptor. The contents of frame 222 is a pointer to a memory address where the TD resides. In one embodiment, a USB schedule for each USB host controller consists of 1024 frames. Each frame 222 may point to one or more USB descriptors. In a classic USB host controller implementation, the USB host controller takes one millisecond to execute each frame. If all the USB descriptors associated with the frame execute within a one millisecond period, the hardware waits for the completion of one millisecond to start executing the next frame to ensure that the 1024 frames have completed execution.

Figure 2B:
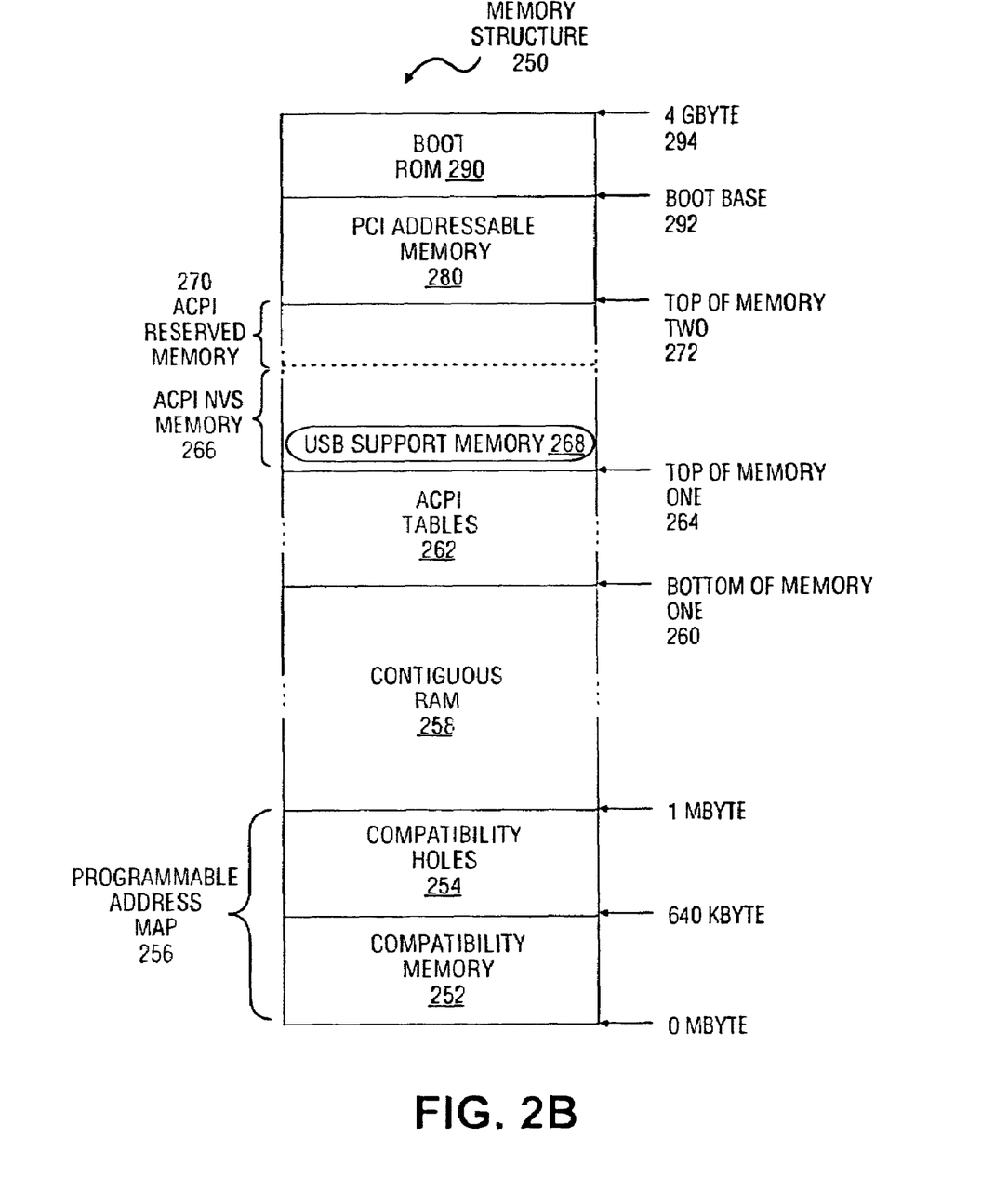

FIG. 2B illustrates a diagram of system memory showing the location of Universal USB support memory. In one embodiment, the system memory may be mapped according to a predetermined specification, such as, for example, the memory structure defined in the Advanced Configuration and Power Interface (ACPI) specification (rev. 2.0 dated Jul. 27, 2000; see also *ACPI Component Architecture Programmer Reference*, rev. 1.05 dated Feb. 27, 2001 available from Intel Corporation, Santa Clara, Calif.). In one embodiment, a portion of the non-volatile sleeping (NVS) region of memory may be used by the USB support software of the BIOS to provide USB device support during system boot up until an operating system including USB device drivers has completed loading.

Pursuant to the ACPI specification, the system memory is mapped according to memory structure 250. Memory structure 250 includes compatibility memory 252, located in the region of memory located at from 0 to 640 Kbytes. Compatibility holes 254 are located at from 640 Kbyte to 1 Mbyte. In traditional systems, the BIOS was limited to accessing compatibility memory 252 and compatibility holes 254. The compatibility memory 252 and compatibility holes 254 may be referred to as the programmable address map (PAM) region of memory 256. The ACPI specification also defines operating system usable system memory as contiguous RAM 258 which is located at from 1 Mbyte to the bottom of memory one 260. In one embodiment, bottom of memory one 260 may be at 8 Mbytes. ACPI tables 262 are located in the region from bottom of memory one 260 to an area referred to in the ACPI specification as the top of memory one, denoted 264. The area of memory between the top of memory one and what the ACPI specification refers to as the top of memory two, denoted 272, is defined to include two regions of memory, ACPI NVS memory 266 and ACPI reserved memory 270. It is a portion of ACPI NVS memory 266 that the method and system described herein uses, in one embodiment, to provide USB support. One portion of memory is denoted USB support memory 268 within or part of ACPI NVS memory 266. It is this portion of system memory that is used for the data format described above regarding FIG. 2A. To complete the memory structure description, the ACPI specification also defines a "no memory region" referred to in one embodiment as Peripheral Component Interconnect (PCI) bus addressable memory 280 located between top of memory two and boot base 292. The memory area from boot base 292 to the top of memory 294, at, in one embodiment, 4 Gbytes, is virtually used for boot ROM 290.

Figure 3:
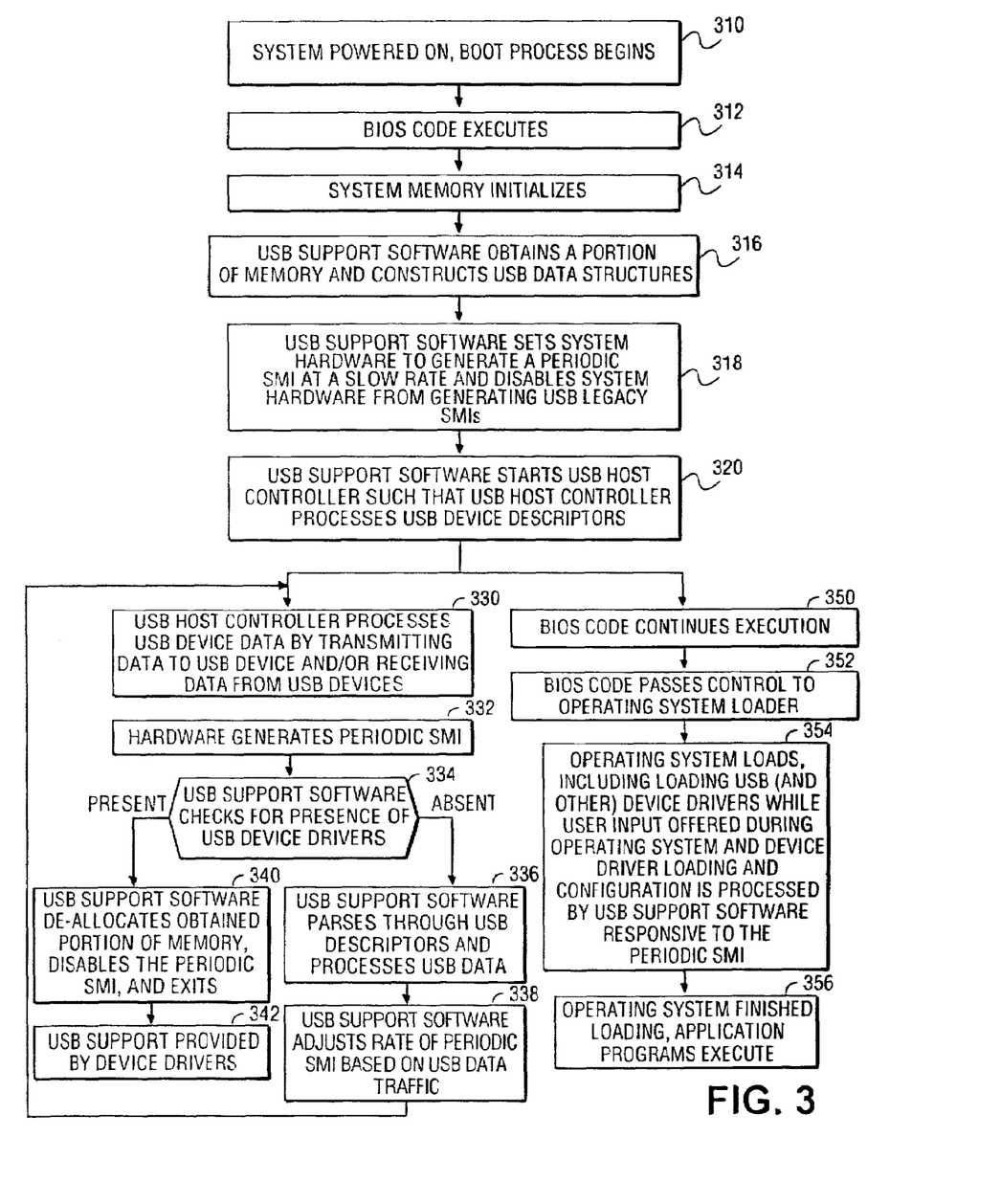
FIG. 3 illustrates a flow of actions taken pursuant to one embodiment of the invention.

FIG. 3 illustrates a flow of actions taken pursuant to one embodiment of the invention. When a system such as a computing device is powered on, the boot process begins, as shown in block 310. The BIOS code executes, as shown in block 312. This process as a whole is sometimes referred to as power on self test (POST). The system memory initializes, as shown in block 314. External bus support software such as USB support software then obtains a portion of memory and constructs USB device data structures, as shown in block 316. The USB device data includes the data described above regarding FIG. 2A. The USB support software then sets the system hardware to generate a periodic SMI at a slow rate, and disables the system hardware from generating USB legacy SMIs, as shown in block 318.

There are various periodic SMI occurrence rates that can be programmed in the chipset (hardware). Periodic SMI rates available on many systems are every 64 seconds (approximately one minute), 32 seconds, 16 seconds, 8 seconds, 64 milliseconds, 32 milliseconds, 16 milliseconds, 8 milliseconds, and one millisecond. These periodic SMI rates are provided as an example, and some hardware embodiments may provide a much wider range of periodic occurrences that may be used by the USB support software and the BIOS. The SMI is initially set by the USB support software to be generated at a slow rate, such as, for example, every minute or every 30 seconds, so as not to unnecessarily impede performance of the system during the boot process by causing unneeded processing of SMIs. The USB support software then starts the USB host controller such that the USB host controller processes USB device descriptors using the obtained portion of memory, the USB support memory, as shown in block 320. To provide USB device support during the remainder of the boot process, execution continues in parallel at block 330 and at block 350.

The USB host controller processes USB device data by transmitting data to USB devices and/or receiving data from USB devices, as shown in block 330. The system hardware then generates a periodic SMI, as shown in block 332. The USB support software then checks for the presence of USB device drivers, as shown in block 334. The USB frame list base address register is set to reflect the address of the location of the USB support memory until the device drivers are loaded. Because the USB frame list base address register is modified when the operating system has loaded the USB drivers, the USB support software uses the technique of looking at the USB frame list base address to determine whether the operating system drivers are loaded (see frame base 202 of FIG. 2A). The USB frame list base address register is located in the USB host controller chipset (hardware) and contains a pointer to the start of the USB frames, which may also be referred to as the USB schedule, constructed by the USB support software or operating system device drivers. When the USB host controller is "started" or "activated" by the USB support software or the operating system drivers, the USB host controller chipset (hardware) executes the USB descriptors located in memory pointed to by the current contents of the USB frame list base address register. The contents of the USB frame list base address register are incremented by a value of four (4) automatically by the USB host controller chipset (hardware) after execution. The USB frame list base address register contents keep rolling in a round-robin fashion, thus executing the active USB descriptors until the USB host controller is "stopped".

If USB device drivers are absent, flow continues at block 334. The USB support software then parses through USB descriptors and processes USB data, as shown in block 336. The parsing involves traversing the descriptors and other data described above regarding FIG. 2A. When the periodic software SMI occurs, after parsing, the processing performed by the USB support software may include passing the USB data to the processor, a keyboard controller, a mouse controller, etc. In this way, the USB data is transferred to the BIOS code or other boot software that is executing. The USB support software may then adjust the rate of the periodic SMI based on the USB data traffic, as shown in block 338. More specifically, in one embodiment, the USB support software may change the periodic software SMI occurrence rate to dynamically complement the rate of the USB data. That is, the SMI occurrence period may be increased, sped up, or decreased, slowed down, as needed. Such speed or period adjustments are often needed when the USB descriptors are transferring user based input. When no input data is received, the rate is reduced; when input data is received, the rate is increased and remains at a faster level, such as, for example, every 16 milliseconds or every 8 milliseconds, until the amount of received data drops off. Execution then continues at block 330.

After the check for the presence of USB device drivers is made, as shown in block 334, if USB device drivers are present, flow continues a block 340, and the USB support software de-allocates the obtained portion of memory, the USB support memory, disables the periodic SMI, and exits, as shown in block 340. USB support is thereafter provided by device drivers, as shown in block 342. In one embodiment, the USB support software may at some point regain control from the operating system and then, again, begin issuing periodic software SMIs and processing USB data. One of example of when this may occur is during a soft reboot.

In parallel with the flow beginning at block 330 is the flow beginning at block 350. The BIOS code continues to execute, as shown in block 350. At some point, the BIOS code passes control to the operating system, as shown in block 352. The operating system loads, including loading USB (and other) device drivers while user input offered during operating system and device driver loading and/or configuration is processed by the USB support software responsive to the periodic SMI, as shown in block 354. The USB support software generates periodic SMIs to invoke the processing of USB data during loading to the operating system. If the USB support software is not included in the system to generate periodic SMIs to invoke the processing of USB data during loading of the operating system, the operating system may hang during boot or input data may be lost when control of the USB devices and USB host controller transitions from the BIOS to the operating system device drivers. The USB support software that causes the generation of periodic SMIs to invoke the processing of USB data during loading of the operating system alleviates missed USB input and alleviates the system hanging during operating system boot should a USB interrupt not be handled.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
    a processor coupled to a bus;
    a memory coupled to the bus;
    an external bus controller coupled to the bus; and
    a basic input-output system (BIOS) coupled to the bus, the BIOS comprising an external bus support component to cause a periodic interrupt to be generated and to provide support for external bus enabled devices responsive to the periodic interrupt.

2. The system of claim 1 wherein the external bus support component is to provide support for external bus enabled devices until an operating system providing external bus support is loaded.

3. The system of claim 1 wherein the external bus enabled devices comprise at least one of a keyboard, a mouse, a floppy drive, a biometric device, a hard disk drive, a compact disk read-only memory (CD-ROM) player.

4. The system of claim 1 wherein:
    the external bus controller is a Universal Serial Bus (USB) host controller;
    the external bus support component is a USB support component; and
    the external bus enabled devices are USB devices.

5. The system of claim 1 wherein the memory is mapped according to the Advanced Configuration and Power Interface (ACPI) specification and the BIOS comprises a software component to implement the ACPI specification.

6. The system of claim 1 wherein the processor conforms to the 32 bit Intel Architecture (IA-32) and the periodic interrupt is a system management interrupt (SMI).

7. The system of claim 1 wherein the processor is compatible with the 32 bit Intel Architecture (IA-32).

8. A system comprising:
    a processor coupled to a bus;
    a memory coupled to the bus;
    an external bus controller coupled to the bus;
    an external bus enabled device coupled to the external bus controller;
    an external bus support component coupled to the bus;
    a basic input-output system (BIOS) coupled to the bus, the BIOS having instructions which when executed cause the processor to perform operations comprising:
        obtaining a portion of the memory to be used to maintain a plurality of external bus device data;
        causing the external bus support component to periodically generate an interrupt; and
        handling input produced by the external bus enabled device using the portion of the memory responsive to the interrupt.

9. The system of claim 8 wherein the processor conforms to the 32-bit Intel Architecture (IA-32) and the interrupt is a system management interrupt (SMI).

10. The system of claim 8 wherein the BIOS has further instructions which when executed cause the processor to perform further operations comprising:
    disabling the periodically generated interrupt when an operating system providing external bus device support is completely loaded.

11. The system of claim 8 wherein the BIOS has further instructions which when executed cause the processor to perform further operations comprising:
    de-allocating the portion of the memory when an operating system providing external bus device support is completely loaded.

12. The system of claim 8 wherein:
    the external bus controller is a Universal Serial Bus (USB) host controller;
    the external bus support component is a USB support component; and
    the external bus enabled device is a USB device.

13. The system of claim 8 wherein obtaining comprises:
    mapping a memory pursuant to the Advanced Configuration and Power Interface (ACPI) specification to include a non-volatile-sleeping (NVS) memory region such that the portion of the memory is in the NVS memory region.

14. A method comprising:
    obtaining a portion of a memory to be used to maintain a plurality of USB device data about one or more USB devices connected to an external bus controller;
    causing an interrupt to be periodically generated by an external bus support component; and
    handling input produced by the one or more USB devices using the portion of the memory.

15. The method of claim 14 wherein the interrupt is a system management interrupt (SMI) of the 32-bit Intel Architecture (IA-32).

16. The method of claim 14 further comprising:
disabling the periodically generated interrupt when an operating system providing USB device support is completely loaded.

17. The method of claim 14 further comprising:
de-allocating the portion of the memory when an operating system providing USB device support is completely loaded.

18. The method of claim 14 further comprising:
mapping a memory pursuant to the Advanced Configuration and Power Interface (ACPI) specification to include a non-volatile-sleeping (NVS) memory region such that the portion of the memory is in the NVS memory region.

19. The method of claim 14 further comprising:
sending data to one or more USB devices using the portion of the memory.

20. The method of claim 14 further comprising:
determining whether an operating system providing USB device support is loaded.

21. The method of claim 20 wherein determining comprises:
checking a frame list base address register value to determine whether it is set to the address of the portion of the memory.

22. The method of claim 14 further comprising:
disabling conversion of USB hardware interrupts into USB legacy software interrupts; and
disabling the periodically generated interrupts.

23. The method of claim 14 further comprising:
adjusting the rate of the interrupt based on data traffic involving the one or more USB devices.

24. A machine readable medium having instructions thereon which when executed by a processor cause the instructions to be copied to a basic input-output system (BIOS) such that during subsequent boot up of a system including the processor, the processor performs operations comprising:
obtaining a portion of a memory to be used to maintain a plurality of external bus device data about an external bus enabled device connected to an external bus controller;
causing an interrupt to be periodically generated by an external bus support component; and
handling input produced by the external bus enabled device using the portion of the memory responsive to the interrupt.

25. The machine readable medium of claim 24 wherein the processor conforms to the 32-bit Intel Architecture (IA-32) and the interrupt is a system management interrupt (SMI).

26. The machine readable medium of claim 24 having further instructions thereon which, after being copied to the BIOS, when executed, cause the processor to perform further operations comprising:
disabling the periodically generated interrupt when an operating system providing external bus device support is completely loaded.

27. The machine readable medium of claim 24 having further instructions thereon which, after being copied to the BIOS, when executed, cause the processor to perform further operations comprising:
de-allocating the portion of the memory when an operating system providing external bus device support is completely loaded.

28. The system of claim 24 wherein:
the external bus controller is a Universal Serial Bus (USB) host controller;
the external bus support component is a USB support component; and
the external bus enabled device is a USB device.

29. The machine readable medium of claim 24 wherein obtaining comprises:
mapping the memory pursuant to the Advanced Configuration and Power Interface (ACPI) specification to include a non-volatile-sleeping (NVS) memory region such that the portion of the memory is in the NVS memory region.

* * * * *